United States Patent [19]

Ruhnke

[11] Patent Number: 4,801,283
[45] Date of Patent: Jan. 31, 1989

[54] MIXING TUBE ASSEMBLY FOR MARINE PROPULSION SYSTEM

[75] Inventor: Jeffrey P. Ruhnke, Fond du Lac, Wis.

[73] Assignee: Brunswick Corporation, Skokie, Ill.

[21] Appl. No.: 133,746

[22] Filed: Dec. 16, 1987

[51] Int. Cl.$^4$ .............................................. F01N 3/04
[52] U.S. Cl. ......................................... 440/88; 440/89; 60/310
[58] Field of Search ...................... 440/88, 89, 900; 60/310

[56] References Cited

U.S. PATENT DOCUMENTS

| | | | |
|---|---|---|---|
| 2,708,824 | 5/1955 | Engstrom | 60/310 |
| 3,324,533 | 6/1967 | Watteau | 440/89 |
| 3,541,786 | 11/1970 | Sarra | 60/310 |
| 4,573,318 | 3/1986 | Entringer et al. | 60/310 |

*Primary Examiner*—Joseph F. Peters, Jr.
*Assistant Examiner*—Edwin L. Swinehart
*Attorney, Agent, or Firm*—Andrus, Sceales, Starke & Sawall

[57] ABSTRACT

In a marine propulsion system including an internal combustion engine, a mixing tube assembly is disposed between an exhaust manifold and a discharge pipe for discharging mixed water and exhaust. The mixing tube assembly is adapted for connection to the exhaust manifold by means of a resilient connector member, such as a flanged rubber boot. This form of connection allows the adjacent surfaces of the mixing tube and the manifold to be non-machined, and provides suspension of the mixing tube from the manifold. The mixing tube includes an exhaust passage having a water jacket therearound for cooling exhaust passing therethrough. A water inlet is provided for introducing water into the water jacket. Water is discharged from the water jacket through a circumferential water discharge outlet, and exhaust is discharged from the exhaust passage through an exhaust outlet. A mixing cavity is disposed downstream of the water jacket and the exhaust passage for receiving discharged water and exhaust and mixing the water with the exhaust prior to discharge through a discharge outlet.

17 Claims, 1 Drawing Sheet

MIXING TUBE ASSEMBLY FOR MARINE PROPULSION SYSTEM

BACKGROUND AND SUMMARY

This invention relates to a marine propulsion system in which exhaust is discharged from an exhaust manifold and is mixed with water prior to discharge.

In a marine propulsion system including an internal combustion engine, it is known to mix the engine combustion product exhaust with coolant water prior to its discharge. Various structures have been developed for providing such mixing of exhaust with water. One such structure is shown in U.S. Pat. No. 4,573,318 to Entringer et al. This patent discloses an exhaust elbow for connection to a water jacketed exhaust manifold. The exhaust elbow includes an exhaust passage with a water jacket therearound. The exhaust passage communicates with an exhaust outlet provided in the engine exhaust manifold for discharging exhaust therefrom. The water jacket receives cooling water from the engine cooling system, and discharges such cooling water into the exhaust prior to discharge. This form of exhaust elbow is particularly suited for a marine propulsion system utilizing an open cooling system. Another structure for mixing engine exhaust with water prior to discharge is disclosed in copending application Ser. No. 07/177,677 filed Apr. 5, 1988 in the name of Lulloff et al, and assigned to the same assignee as is the present application. This application discloses a combination exhaust manifold and exhaust elbow, with water jackets provided around the entire assembly. This structure is also particularly suited to use with an engine which is cooled by an open cooling system. The structures disclosed in the above-noted patent documents require a machined surface for connection to the engine exhaust manifold or to the engine cylinder block, for use in conjunction with a gasket or the like to provide a seal between the surfaces. Such a gasketed connection creates the potential for leakage and/or corrosion at the gasket interface.

Additionally, the mixing of exhaust with cooling water prior to discharge can create problems with an internal combustion engine cooled by a closed cooling system. In a closed cooling system, a heat exchanger typically utilizes intake sea or lake water to cool an engine coolant, such as glycol, provided in the closed system. Thereafter, the intake water is mixed with the exhaust to cool the exhaust prior to discharge. In seawater applications, where saltwater is taken in to cool the glycol engine coolant, a corrosive reaction results when the saltwater is exposed to the exhaust gases. The spray of saltwater evaporates as it contacts the hot exhaust gases, which causes a buildup of salts on the walls of the casting. The wet, steamy environment creates galvanic corrosion, which in time will corrode through the piece in which the mixing occurs. This piece must then be replaced. With previous one-piece exhaust systems, such replacement can result in substantial expense due to the complexity of the piece.

The present invention is designed to provide a mixing tube assembly for mixing exhust gases with coolant water in an integral, one-piece tube. The tube can be a cast member with non-machined surfaces, adapted for connection to an engine exhaust manifold by means of a resilient connector member, such as a rubber boot or the like. The invention is well suited for applications involving a closed cooling system, in which the intake coolant water, such as salt water, is discharged from a heat exchanger or the like directly into an inlet provided on the mixing tube. In accordance with the invention, an integral mixing tube assembly includes an exhaust passage having an exhaust inlet for receiving exhaust from the engine and an exhaust discharge outlet downstream of the inlet. Water jacket means is provided around the exhaust passage, and includes water discharge outlet means for discharging water from the water jacket means. A water inlet is provided for introducing water into the water jacket means. In seawater applications, the water inlet introduces saltwater into the water jacket means for cooling exhaust within the exhaust passage. A mixing cavity is provided downstream of the exhaust passage and the water jacket means for receiving and mixing exhaust from the exhaust discharge outlet with water from the water discharge outlet from the water jacket means. The mixing cavity has an outlet for discharging mixed water and exhaust therefrom. As noted, the mixing tube assembly can be a cast member adapted for connection to the exhaust manifold by means of a resilient connector, such as a rubber boot. The downstream end of the mixing tube assembly can be connected by means of a resilient connector member to a discharge pipe for discharting the mixed water and exhaust. In this manner, the mixing tube assembly is essentially "suspended" from the exhaust manifold. In the event the mixing tube assembly corrodes through by the above-discussed galvanic corrosion caused by saltwater mixing with hot exhaust gases, the mixing tube assembly can simply be removed and replaced inexpensively and easily.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
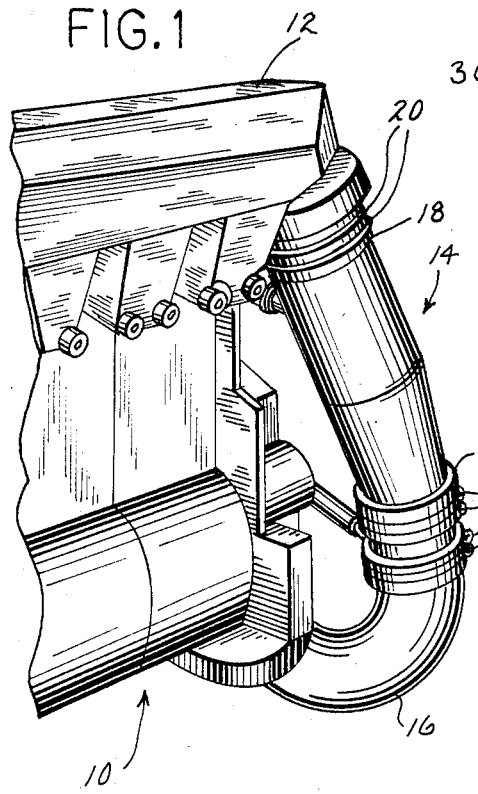
FIG. 1 is an isometric view showing the mixing tube assembly of the invention as installed on a marine propulsion system.

As shown in FIG. 1, a marine propulsion system includes an internal combustion engine 10 having a jacketed exhaust manifold 12 connected thereto. In the embodiment shown, engine 10 is cooled by means of a closed cooling system utilizing a colling liquid such as glycol or the like. A mixing tube assembly 14 is connected to exhaust manifold 12 for receiving exhaust therefrom and mixing the exhaust with cooling water prior to discharge of the mixed exhaust and water through a discharge pipe 16. The upper end of mixing tube assembly 14 is connected to exhaust manifold 12 by means of a rubber boot 18 and a pair of hose clamps 20. The lower end of mixing tube assembly 14 is connected to discharge pipe 16 by means of a rubber connector section 22 and a series of hose clamps 24.

Figure 2:
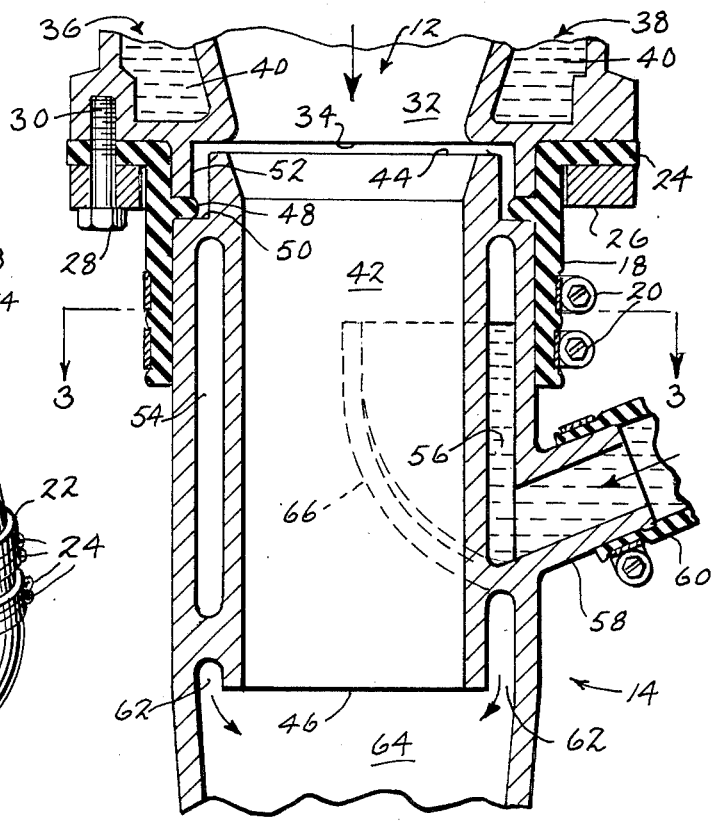
FIG. 2 is a detailed partial sectional view of the upper end of the mixing tube assembly shown in FIG. 1.

With reference to FIG. 2, rubber boot 18 includes an upper peripheral flange 24. A circular retaining ring 26 is adapted for placement over flange 24, and includes a series of openings to accommodate a series of bolts, such as 28, which secure ring 26 and flange 24 to exhaust manifold 12 by mating with a series of openings, such as 30, provided therein.

Exhaust manifold 12 includes an exhaust discharge passage 32 having an exhaust outlet 34 for discharging exhaust therefrom. As noted, exhaust manifold 12 is jacketed, and includes pockets such as 36, 38 through which engine coolant, such as a glycol liquid 40, circulates to cool exhaust as it passes through passage 32 in manifold 12.

Mixing tube assembly 14 has an exhaust passage 42 with an exhaust inlet 44 adapted for placement adjacent manifold exhaust outlet 34 for receiving exhaust therefrom and allowing such exhaust to pass into exhaust passage 42. An exhaust outlet 46 is provided downstream of exhaust inlet 44 for discharging exhaust from exhaust passage 42.

Rubber boot 18 includes an inner circumferential protrusion 48, which is disposed between a circumferential shoulder 50 formed on mixing tube assembly 14 and a circumferential lip 52 formed on exhaust manifold 12. When retainer ring 26 is connected to manifold 12 with flange 24 of rubber boot 18 therebedtween, protrusion 48 acts to provide a sealed passage for exhaust between manifold exhaust outlet 34 and exhaust inlet 44 in mixing tube assembly 14. With this arrangement, mixing tube assembly 14 is essentially "suspended" from exhaust manifold 12.

The use of a resilient connector, such as rubber boot 18, to connect mixing tube assembly 14 to manifold 12 eliminates the nedd for machining the adjacent surfaces of manifold 12 and mixing tube assembly 14. These surfaces may thus be cast, and do not require a gasket to provide a seal therebetween. In this manner, alignment of the adjacent surfaces of mixing tube assembly 14 and manifold 12 is not as critical as with machined and gasketed surfaces.

Water jacket means, including pockets 54 and 56, is provided around exhaust passage 42 in the upper end of mixing tube assembly 14. A water inlet 58 is formed in the side of mixing tube assembly 14 and communicates with pocket 56 for supplying cooling water to pockets 54 and 56. Water inlet 58 is adapted to receive intake water through a hose 60 from a heat exchanger or the like (not shown), after the intake water has been used to cool the glycol coolant in the closed cooling system. With this structure, the engine exhaust is cooled by coolant 40 as the exhaust passes through manifold 12 and by intake water as the exhaust passes through mixing tube assembly 14.

Exhaust outlet 46 in exhaust passage 42 discharges exhaust therefrom into a downstream mixing cavity 64. A circumferential water discharge outlet 62 is provided in the lower end of water jacket pockets 54, 56 about the periphery of exhaust passage 42, to discharge water from pockets 54, 56 into mixing cavity 64. In mixing cavity 64, water discharged through water discharge outlet 62 is mixed with exhaust discharged from exhaust passage 42 via exhaust outlet 46 and exits mixing cavity 64 via a discharge outlet leading to discharge pipe 16. This configuration and placement of exhaust discharge outlet 46 and water discharge outlet 62 prevents the inhalation of water through exhaust passage 42 and into manifold 12, to prevent fouling of the engine and internal corrosion.

Figure 3:
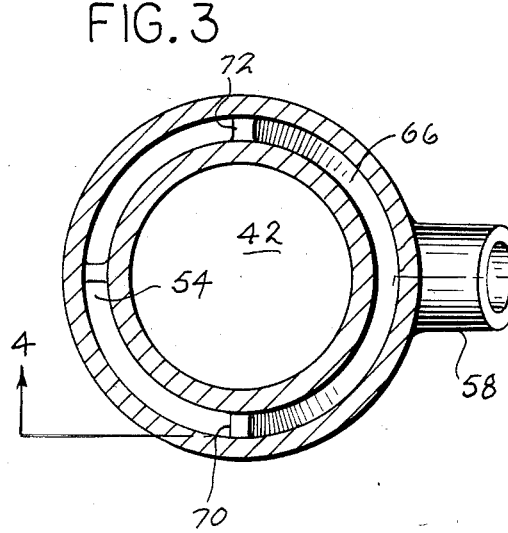
FIG. 3 is a sectional view taken generally along line 3—3 of FIG. 2.
Figure 4:
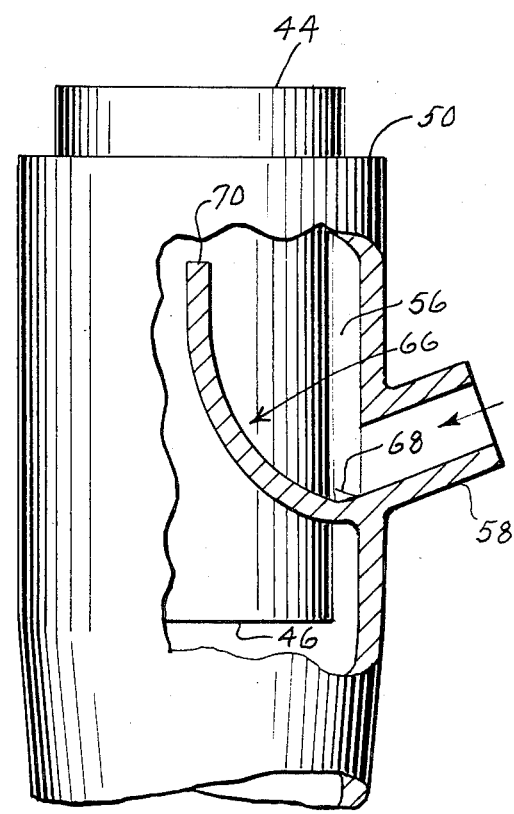
FIG. 4 is a sectional view taken generally along line 4—4 of FIG. 3.

A dam 66 is provided in the water jacket around exhaust passage 42. Dam 66 includes a lowermost point 68 disposed adjacent the opening of inlet 58 into water jacket pocket 56. Dam 66 has a concave curvature, and extends from lowermost point 68 upwardly around exhaust passage 42 to a air of uppermost points 70, 72. Uppermost points 70, 72 are spaced from each other on either side of exhaust passage 42, and are 180° apart. As shown in FIG. 3, dam 66 is thus provided about substantially half the circumference of the water jacket around exhaust passage 42. Dam 66 acts to direct intake water upwardly upon its entrance through inlet 58 into water jacket pocket 56 to a direction substantially opposite that of the flow of exhaust through exhaust passage 42. The intake water then passes over uppermost points 70, 72 of dam 66 and fills the remaining portions of the water jacket around exhaust passage 42 prior to its discharge through water discharge opening 62. This construction of dam 66 provides circulation of cooling water around substantially the entire length and circumference of the water jacket around exhaust passage 42 to cool exhaust passing therethrough.

The mixing tube constructed as described above thus provides an efficient and effective assembly formixing exhaust and cooling water prior to discharge. The mixing tube is connected in the exhaust system by means of resilient connector members, which allows the tube to be a cast member and the abutting surfaces to be non-machined. Alignment of the tube in the system is thus less critical than when machined abutting surfaces are employed. If the intake water is saltwater, which can cause corrosion in the exhaust system in the area of mixing, the mixing tube alone can be removed and replaced when such corrosion reaches an undesirable level. The mixing tube is a relatively simple member which can be removed and replaced inexpensively and easily.

Various alternatives and modifications are contemplated as being within the scope of the following claims particularly pointing out and distinctly claiming the invention.

I claim:

1. An exhaust discharge assembly for a marine propulsion system in which engine exhaust is mixed with water prior to discharge, comprising:
   an exhaust passage defined by an inner wall and having an exhaust inlet for receiving exhaust from said engine and an exhaust discharge outlet downstream of said inlet;
   water jacket means provided around said exhaust passage and defined by an outer wall spaced from said inner wall, said water jacket means having water discharge outlet means for discharging water from said water jacket means;
   a water inlet for introducing water into said water jacket means;
   dam means provided in said water jacket means between said inner wall and said outer wall adjacent said water inlert for distributing water through said water jacket means adjacent said water inlet; and
   a mixing cavity disposed downstream of said exhaust passage and said water jacket means for receiving and mixing exhaust from said exahust discharge outlet with water from said water discharge outlet means, said mixing cavity having an outlet for discharging mixed water and exhaust therefrom.

2. The exhaust discharge assembly according to claim 1, wherein said water inlet is disposed upstream of said water discharge outlet means.

3. The exhaust discharge assembly according to claim 2, wherein said water inlet is disposed in a side of said assembly.

4. The exhaust discharge assembly according to claim 1, wherein exhaust flows through said exhaust passage in a first direction, and said dam means directs water from said inlet to a second direction of flow substantially opposite said first flow direction of exhaust through said exhaust passage as exhaust flows through said exhaust passage past said dam means, whereafter said water passes over said dam means and flows through said water jacket means prior to discharge therefrom through said water discharge outlet means.

5. The exhaust discharge assembly according to claim 4, wherein said dam means comprises a wall of concave curvature provided in said water jacket means, said wall having a lowermost point adjacent said water inlet and curving upwardly about said exhaust passage to a pair of spaced uppermost points.

6. The exhaust discharge assembly according to claim 5, wherein said inner wall is substantially circular in cross section so as to form a circular exhaust passage, and wherein said pair of spaced uppermost points of said curved wall are disposed on opposite sides of said exhaust passage and spaced so as to be substantially 180° apart, with said exhaust passage being disposed therebetween.

7. An exhaust discharge assembly for placement in a marine propulsion system, including an internal combustion engine, between an engine exhaust outlet and a discharge outlet for discharging engine exhaust mixed with water, comprising:
a mixing tube, including: exhaust inlet means disposed adjacent a first end of said mixing tube, said first end of said mixing tube being adapted for connection to said engine such that said mixing tube exhaust inlet means is in communication with said engine exhaust outlet; water inlet means for introducing water to said mixing tube; mixing cavity means disposed in said mixing tube downstream of said water inlet means and said exhaust inlet means for mixing exhaust passing through said exhaust inlet means with water passing through said water inlet means; and discharge means disposed adjacent a second end of said mixing tube spaced from said first end, for discharging mixed water and exhaust from said mixing cavity means; and
resilient connecting means for connecting said mixing tube to said engine, said resilient connecting means including resilient boot means for receiving and enclosing said first end of said mixing tube, and means interconnected with said resilient boot means for mounting said mixing tube to said engine adjacent said engine exhaust outlet so that said mixing tube is resiliently suspended from said engine by said resilient connecting means.

8. The exhaust discharge assembly according to claim 7, wherein said second end of said mixing tube assembly is adapted for connection to a discharge conduit so that said discharge means adjacent said second end of said mixing tube is in communication with the interior of said discharge conduit for discharging mixed water and exhaust therethrough, and further comprising second resilient connecting means including resilient boot means for receiving and enclosing said second end of said mixing tube and the end of said discharge conduit and for providing a sealed passage between said second end of said mixing tube and said discharge conduit.

9. The exhaust discharge assembly according to claim 7, wherein said resilient connecting means proivides a seal between said mixing tube exhaust inlet means and said engine exhaust outlet to form a sealed passage therebetween.

10. The exhaust discharge assembly according to claim 9, wherein said mixing tube water inlet means is disposed in a side of said mixing tube downstream of said first end of said mixing tube.

11. The exhaust discharge assembly according to claim 10, further comprising an exhaust passage formed by an inner wall in said mixing tube downstream of said exhaust inlet means and including an exhaust discharge outlet leading to said mixing cavity means, and water jacket means around said exhaust passage and including a water discharge outlet leading to said mixing cavity means, said water jacket means being formed by an outer wall spaced from said inner wall, and wherein said water inlet means introduces water to said water jacket means.

12. The exhaust discharge assembly according to claim 11, further comprising dam means in said water jacket means between said inner wall and said outer wall, said dam means being disposed adjacent said water inlet for distributing water through said water jacket means.

13. An exhaust discharge assembly for placement in a marine propulsion system, including an internal combustion engine having a closed cooling system providing coolant circulation through a jacketed exhaust manifold for cooling exhaust passing through said manifold prior to its discharge therefrom through a manifold exhaust outlet, comprising:
a mixing tube, including: an exhaust passage defined by an inner wall and providing an exhaust inlet in a first end of said mixing tube and an exhaust outlet downstream of said exhaust inlet, said first end of said mixing tube being adapted for connection to said exhaust manifold adjacent said manifold exhaust outlet so that said mixing tube exhaust inlet is in communication with said manifold exhaust outlet; water jacket means defined by an outer wall spaced from said inner wall so as to surround said exhaust passage, said water jacket means having water discharge outlet means for discharging water therefrom; a water inlet for introducing intake water into said water jacket means, said water inlet being disposed in a side of said mixing tube downstream of said first end of said mixing tube; a mixing cavity disposed downstream of said water jacket means and said exhaust passage and being in fluid communication with said water discharge outlet means and with said exhaust outlet for receiving and mixing exhaust from said exhaust outlet with intake water discharged from said water jacket means through said water discharge outlet means; and an outlet adjacent a second end of said mixing tube for discharging mixed water and exhaust from said mixing cavity; and
resilient connecting means for connecting said mixing tube to said engine, said resilient connecting means including resilient boot means for receiving and enclosing said first end of said mixing tube, and means interconnected with said resilient boot means for mounting said mixing tube to said manifold adjacent said manifold exhaust outlet such that said mixing tube is resiliently suspended from said manifold by said resilient connecting means.

14. The exhaust discharge assembly according to claim 13, wherein said second end of said mixing tube is adapted for connection to said discharge outlet by means of a second resilient connector means.

15. The exhaust discharge assembly according to claim 13, further comprising dam means in said water jacket means between said inner wall and said outer wall adjacent said water inlet for distributing water through said water jacket means.

16. The exhaust discharge assembly according to claim 15, wherein exhaust flows through said exhaust passage in a first direction, and said dam means directs water from said inlet to a second direction of flow substantially opposite said first flow direction of exhaust through said exhaust passage as exhaust flows through said exhaust passage past said dam means, whereafter said water passes over said dam means and flows through said water jacket means prior to discharge therefrom through said water discharge outlet means.

17. The exhaust discharge assembly according to claim 16, wherein said dam means comprises a wall of concave curvature provided in said water jacket means, said wall having a lowermost point adjacent said water inlet and curving upwardly about said exhaust passage to a pair of spaced uppermost points.

* * * * *